United States Patent [19]
Cullen et al.

[11] Patent Number: 5,722,236
[45] Date of Patent: Mar. 3, 1998

[54] ADAPTIVE EXHAUST TEMPERATURE ESTIMATION AND CONTROL

[75] Inventors: Michael John Cullen, Northville; Bradley John Hieb, Dearborn; Christopher K. Davey, Novi, all of Mich.

[73] Assignee: Ford Global Technologies, inc., Dearborn, Mich.

[21] Appl. No.: 768,004

[22] Filed: Dec. 13, 1996

[51] Int. Cl.$^6$ .................................................. F01N 3/20
[52] U.S. Cl. .................. 60/274; 60/276; 60/289; 60/297; 60/301; 73/118.1
[58] Field of Search ............................. 60/274, 276, 289, 60/297, 301; 73/118.1

[56] References Cited

U.S. PATENT DOCUMENTS

| | | | |
|---|---|---|---|
| 5,388,403 | 2/1995 | Nagami | 60/289 |
| 5,402,641 | 4/1995 | Katoh et al. | 60/285 |
| 5,414,994 | 5/1995 | Cullen et al. | 60/274 |
| 5,444,977 | 8/1995 | Kawabata | 60/285 |
| 5,584,176 | 12/1996 | Meyer | 60/277 |
| 5,606,855 | 3/1997 | Tomisawa | 60/276 |
| 5,619,852 | 4/1997 | Uchikawa | 60/276 |

*Primary Examiner*—Douglas Hart
*Attorney, Agent, or Firm*—Allan J. Lippa; Roger L. May

[57] ABSTRACT

A method and apparatus for inferring and controlling the temperature of a $NO_x$ trap located downstream from a three-way catalyst that employs a temperature sensor to correct a temperature estimation model under relatively steady-state conditions to provide a more accurate estimate of $NO_x$ trap temperature and three-way catalyst temperature. In a second embodiment, the three-way catalyst also includes a temperature sensor for improving the instantaneous catalyst temperature estimation.

12 Claims, 8 Drawing Sheets

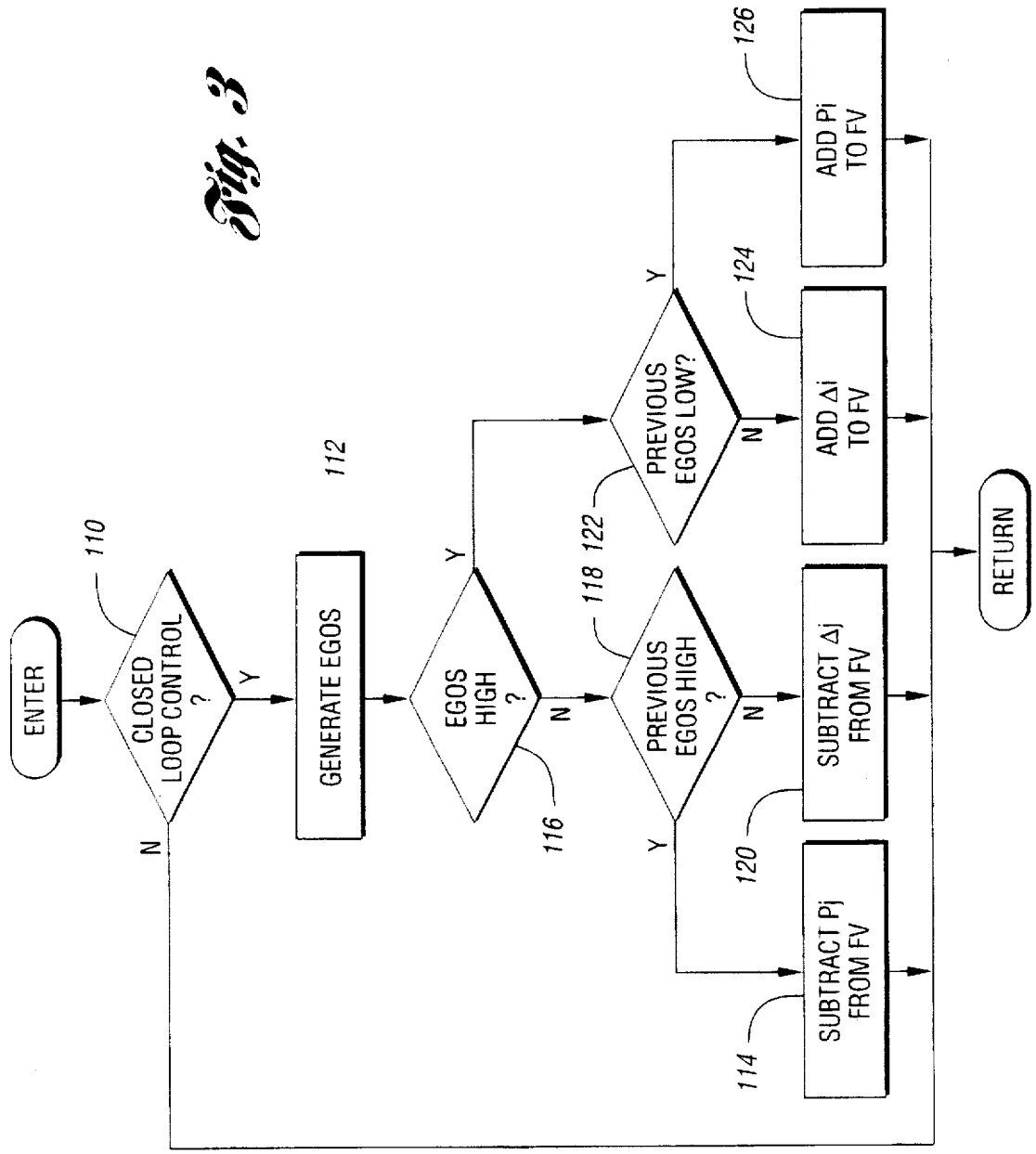

ADAPTIVE EXHAUST TEMPERATURE ESTIMATION AND CONTROL

TECHNICAL FIELD

This invention relates to vehicle emissions control and, more particularly, to a method and apparatus for correcting a temperature model of an exhaust passage including a catalytic converter and a $NO_x$ (nitrogen oxides) trap using a temperature sensor for adaptive feedback control.

BACKGROUND ART

Conventional lean burn engine control systems include an air/fuel controller that delivers fuel to the engine intake manifold proportional to measured air mass to maintain a desired air/fuel ratio, lean of stoichiometric. The typical three-way catalytic converter provided in the engine exhaust passage does not convert the $NO_x$ produced while running lean; and in order to reduce $NO_x$ emission to the atmosphere, it has been proposed to locate a $NO_x$ trap downstream of the three-way catalyst. A typical $NO_x$ trap utilizes alkali metal or alkaline earth materials in combination with platinum in order to store or occlude $NO_x$ under lean operating conditions. The mechanisms for $NO_x$ storage involves the oxidation of NO to $NO_2$ over the platinum followed by the subsequent formation of a nitrate complex with the alkaline metal or alkaline earth. Under stoichiometric operation or operation rich of stoichiometric, the nitrate complexes are thermodynamically unstable, and the stored $NO_x$ is released and catalytically reduced by the excess of CO, $H_2$, and hydrocarbons (HCs) in the exhaust. Accordingly, the lean burn engine is periodically switched to a relatively rich air/fuel ratio to purge the $NO_x$ trap. The $NO_x$ trap must be exposed to a minimum threshold temperature before it will perform efficiently and, accordingly, a minimum exhaust temperature must be established before a lean burn mode of engine operation is established. There is also an upper or maximum temperature above which the trap may be degraded.

Over time, the $NO_x$ trap becomes saturated with sulfur oxides ($SO_x$) and must be purged of the $SO_x$ in order to be able to trap the $NO_x$. One of the methods for purging the $SO_x$ is to introduce air directly into the exhaust passage just upstream of the trap thereby raising the temperature of the trap and burning off the sulfur deposits. In order to purge the $SO_x$, the $NO_x$ trap must be heated using an air pump and engine A/F enrichment (so excess fuel burns in the trap). The temperature required for purging the trap is close to that at which the trap suffers degradation. It has been proposed to locate a temperature sensor at the trap to provide temperature information to the control system. While the sensor provides accurate information at steady-states, it is expensive and moreover is too slow for accurate control in transient driving. The sensor has a long time constant (approximately 15 seconds). In that amount of time, the $NO_x$ trap may suffer damage. Further, the control system needs temperature information at several points in the exhaust system. It is too expensive to locate sensors at each location.

A method of estimating $NO_x$ trap temperature is disclosed in copending application FMC 0778 PUS, filed concurrently with this application by the assignee of this application, and is incorporated herein by reference. While the open loop approach to modeling $NO_x$ trap temperature disclosed in that application avoids the need for a sensor and is reasonably accurate, a more accurate $NO_x$ trap temperature estimate is desirable.

SUMMARY OF THE INVENTION

In view of the above, it is an object of the present invention to provide a method and apparatus for inferring and controlling the temperature of a $NO_x$ trap located downstream from a three-way catalyst. The trap employs a temperature sensor to correct the model under relatively steady-state conditions to provide a more accurate estimate of $NO_x$ trap temperature.

In accordance with the present invention, a temperature sensor is added to improve temperature estimation accuracy. The problems of sensor time constant and need for multiple sensors are handled in the present invention by an adaptive temperature control scheme. The sensor is used to correct the model under relatively steady-state conditions and the corrected model is used under all conditions and all locations for various powertrain control functions including control of $NO_x$ trap temperatures.

In a second embodiment of the invention, a temperature sensor is included to measure the temperature in the three-way converter. In this embodiment, the catalytic converter temperature sensor is used to correct inferred or estimated catalyst midbed temperature obtained through use of the temperature model.

BRIEF DESCRIPTION OF THE DRAWINGS

A more complete understanding of the present invention may be had from the following detailed description which should be read in conjunction with the drawings in which:

FIGS. 2, 3 and 4 are high level flowcharts of conventional engine fuel control and $NO_x$ purging schemes;

DETAILED DESCRIPTION OF THE PREFERRED EMBODIMENT

Figure 1:
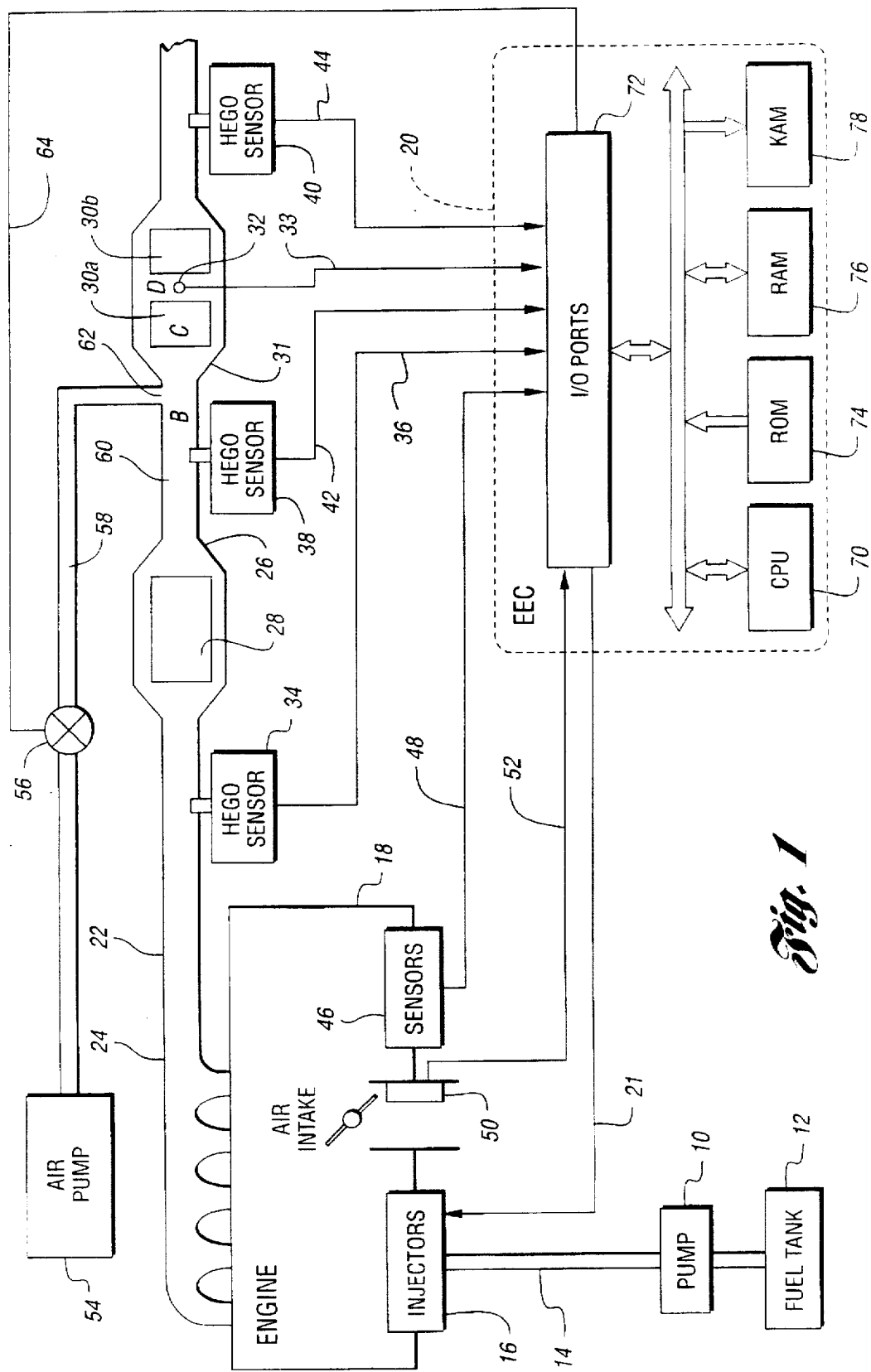
FIG. 1 is a block diagram of a vehicle engine and an electronic engine controller which embodies the principles of the invention.

Referring now to the drawings, and initially to FIG. 1, a fuel pump 10 pumps fuel from a tank 12 through a fuel line 14 to a set of injectors 16 which inject fuel into an internal combustion engine 18. The fuel injectors 16 are of conventional design and are positioned to inject fuel into their associated cylinder in precise quantities as determined by an electronic engine controller (EEC) 20. The EEC 20 transmits a fuel injector signal to the injectors 16 via signal line 21 to maintain an air/fuel ratio determined by the EEC 20. The fuel tank 12 contains liquid fuels, such as gasoline, methanol or a combination of fuel types. An exhaust system 22, comprising one or more exhaust pipes and an exhaust flange 24, transports exhaust gas produced from combustion of an air/fuel mixture in the engine to a conventional three way catalytic converter 26. The converter 26, contains a catalyst material 28 that chemically alters exhaust gas that is produced by the engine to generate a catalyzed exhaust gas.

The catalyzed exhaust gas is fed to a downstream $NO_x$ trap 30 composed of material of the type previously described. The trap 30 is contained in a housing generally indicated at 31. The $NO_x$ trap is shown as comprising two spaced apart portions or "bricks" 30a and 30b. Located in the space between the two bricks is a temperature sensor 32 for monitoring the temperature of the $NO_x$ trap and communicating with the EEC 20 over conductor 33. The sensor 32 provides an accurate measurement of the temperature of the trap during steady-state condition but has a time constant of about 15 minutes during which time measurement data is relatively inaccurate. A heated exhaust gas oxygen (HEGO) sensor 34, detects the oxygen content of the exhaust gas generated by the engine 18, and transmits a signal over conductor 36 to the EEC 20. A pair of HEGO sensor 38 and 40 are located upstream and downstream respectively of the trap 30, and provide signals to the EEC 20 over conductors 42 and 44 respectively. Still other sensors, indicated generally at 46, provide additional information about engine performance to the EEC 20, such as crankshaft position, angular velocity, throttle position, air temperature, etc. The information from these sensors is used by the EEC 20 to control engine operation.

A mass air flow sensor 50 positioned at the air intake of engine 18 detects the amount of air inducted into an induction system of the engine and supplies an air flow signal over conductor 52 to the EEC 20. The air flow signal is utilized by EEC 20 to calculate a value termed air mass (AM) which is indicative of a mass of air flowing into the induction system in lbs./min.

An air pump 54, which may be electrically powered or mechanically coupled to the engine 18 provides a pressurized source of air from the atmosphere, for injecting air through an air passage 58 into an exhaust passage portion 60 at a pierce point 62 downstream of the catalytic converter 26 and generally at the entrance of the $NO_x$ trap 30. The amount of air injected depends on the positioning of a control valve 56 under the control of EEC 20 over conductor 64. The control valve 56 may be ON/OFF valve which opens and closes in accordance with a control signal or may be a flow control valve which can adjust flow rate continuously.

The EEC 20 comprises a microcomputer including a central processor unit (CPU) 70, input and output (I/O) ports 72, read only memory (ROM) 74 for storing control programs, random access memory (RAM) 76, for temporary data storage which may also be used for counters or timers, and keep-alive memory (KAM) 78 for storing learned values. Data is communicated over a conventional data bus as shown. The EEC 20 also includes an engine off timer that provides a record of the elapsed time since the engine was last turned off as a variable "soaktime".

Figure 2:
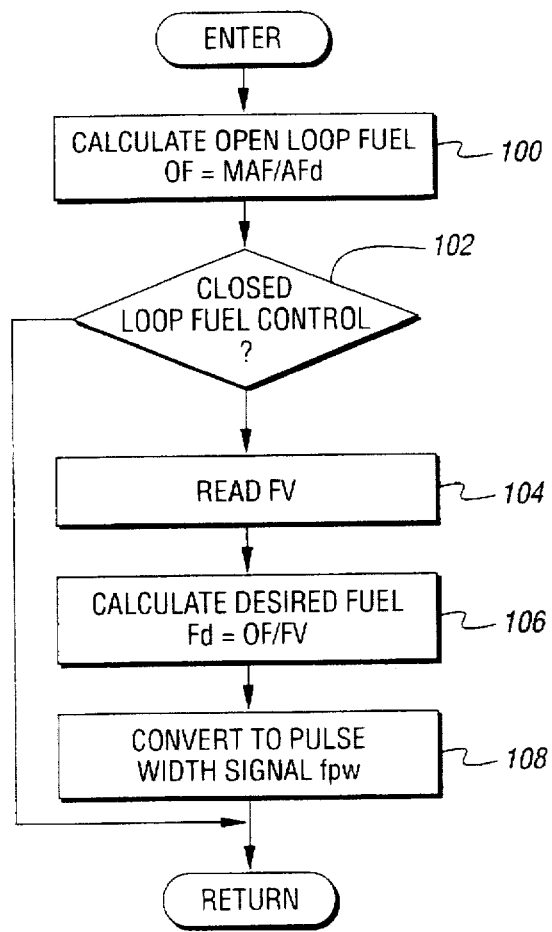

The liquid fuel delivery routine executed by controller 20 for controlling engine 18 is shown in the flowchart of FIG. 2. An open loop calculation of desired liquid fuel is calculated at block 100. More specifically, the measurement of inducted mass airflow (MAF) from sensor 34 is divided by a desired air/fuel ratio (AFd) which in this example, is correlated with stoichiometric combustion. At decision block 102 a determination is made whether closed loop feedback control is desired, by monitoring engine operating parameters such as engine coolant temperature. Fuel command or desired fuel signal Fd is generated by dividing feedback variable FV, read at block 104, into the previously generated open loop calculation of desired fuel in block 106. Desired fuel signal Fd is then converted to a pulse width signal fpw at block 108 for actuating fuel injector 16, thereby delivering fuel to engine 18 in relation to the magnitude of the desired fuel signal Fd.

The air/fuel feedback routine executed by controller 20 to generate fuel feedback variable FV is shown in the flowchart in FIG. 3. Under closed loop control as determined at block 110, a two-state signal EGOS is generated at block 112 from the signal provided by the sensor 34. Predetermined proportional tern Pj is subtracted from feedback variable FV at block 114 when the signal EGOS is low, but was high during the previous background loop of controller 20 as determined at decision blocks 116 and 118. When signal ECOS is low and was also low during the previous background loop predetermined integral term $\Delta j$, is subtracted from feedback variable FV at block 120.

On the other hand, when signal EGOS is high and was also high during the previous background loop of controller 20, as determined at decision blocks 116 and 122, integral term $\Delta i$ is added to feedback variable FV at block 124. When signal EGOS is high but was low during the previous background loop proportional term Pi is added to feedback variable FV at block 126.

Figure 4:
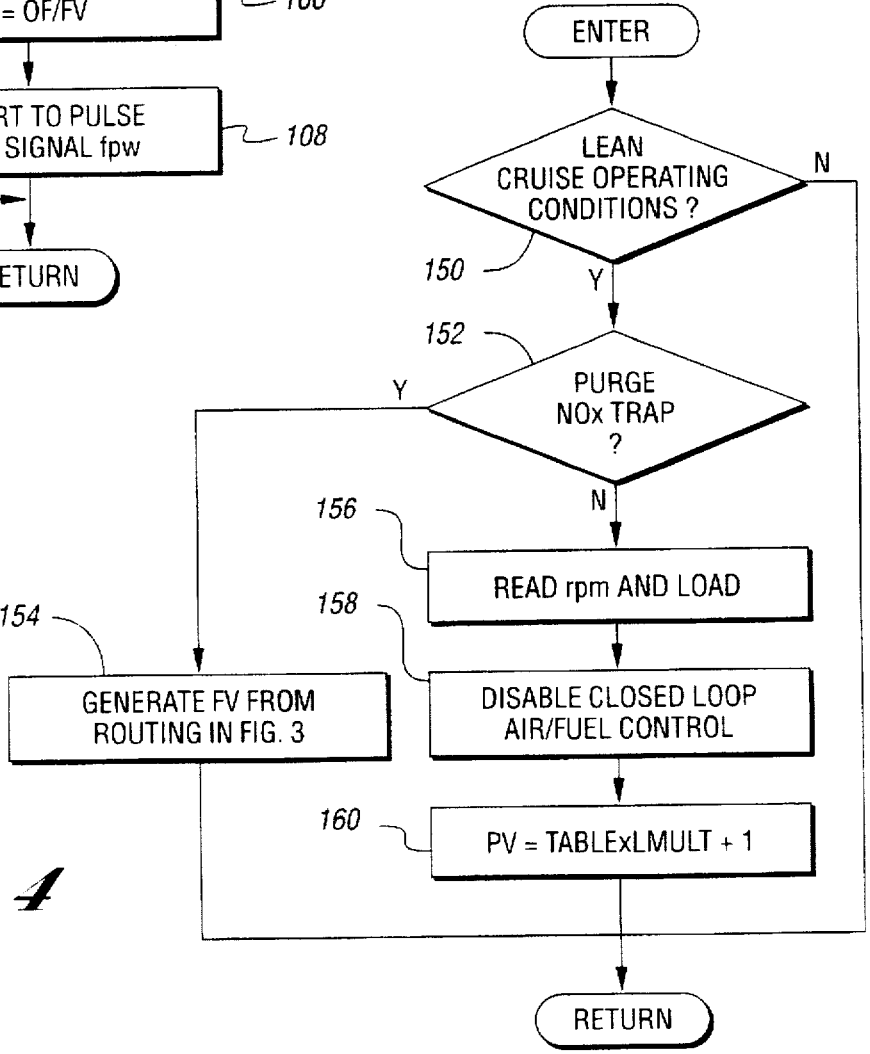

Referring now to FIG. 4, the lean cruise mode of engine operation is depicted. In general, during the lean cruise mode, air/fuel operation proceeds open loop at a predetermined value such as 19 lb air/lb fuel for enhanced fuel economy. $NO_x$ trapping material 32 will store nitrogen oxides passing through catalytic converter 26. Periodically, the material 32 must be purged of stored nitrogen oxides by operating the engine at an air/fuel ratio rich of stoichiometric. Lean cruise operating conditions such as vehicle speed being above a predetermined value or throttle position being above a predetermined value are checked at block 150. Lean cruise operation will commence unless the material 32 is near its capacity and should be purged as determined at block 152. Should that be the case, feedback variable FV is generated at block 154 as provided in a closed loop stoichiometric air/fuel ratio or in an open loop air/fuel ratio rich of stoichiometric. Purging of the $NO_x$ trap may continue for a variable time internal until the trap is relatively free of $NO_x$. Various procedures have been proposed for determining when to terminate purge as well as when to initiate a $SO_x$ purge of the trap. See for example, copending application Ser. No. 08/733,079, filed Oct. 16, 1996, and assigned to the assignee of the present invention.

On the other hand, if purge conditions are not present, the routine continues for lean cruise conditions. Engine rpm and load are read at block 156, closed loop air/fuel control is disabled at block 158, and feedback variable FV is generated in an open loop manner to provide lean air/fuel engine operation. More specifically, at block 160 in this particular example, feedback variable FV is generated by reading a look-up table value as a function of engine speed and load and multiplying the table value by a multiplier LMULT. The resulting product is then added to unity which is the stoichiometric air/fuel reference. Multiplier LMULT, which varies between 0 and unity, is gradually incremented to ramp engine air/fuel operation to a desired lean air/fuel ratio. Feedback variable FV is thereby generated which is an indication of desired air/fuel air ratio.

The operations of running lean followed by a $NO_x$ purge operation continue as long as the efficiency of the trap remains above a desired efficiency. As the efficiency decreases, the lean cruise time may be reduced in order to purge the trap more frequently. It is known, however, that sulfur in the fuel will contaminate the $NO_x$ trap with sulfur oxides ($SO_x$) and if not removed will render the $NO_x$ trap incapable of performing the $NO_x$ trapping function. If the efficiency of the trap requires purging more frequently than a predetermined time interval, it may indicate that a $SO_x$ purge is needed. A $SO_x$ purge requires passing exhaust gases over the trap at a higher temperature than that necessary for $NO_x$ purging. To achieve the higher temperature, additional air is introduced from the air pump 54, under control of the controller 20, at the pierce point 62 near the entrance area of the trap 30 and just downstream of the location generally indicated at "B" in FIG. 1.

Figure 5A:
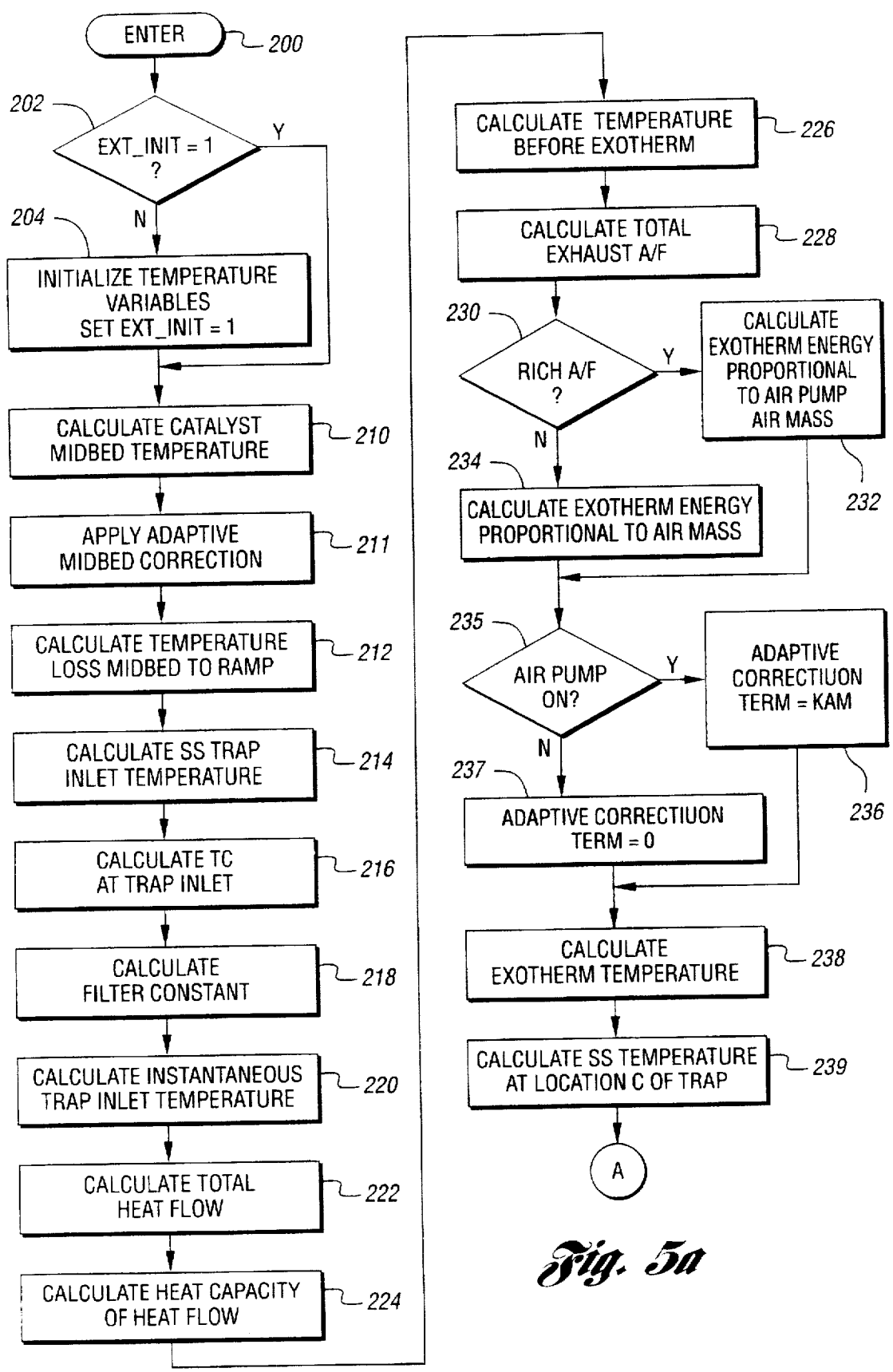
FIG. 5 is a flowchart of the $NO_x$ trap temperature determining method of the present invention.
Figure 5B:
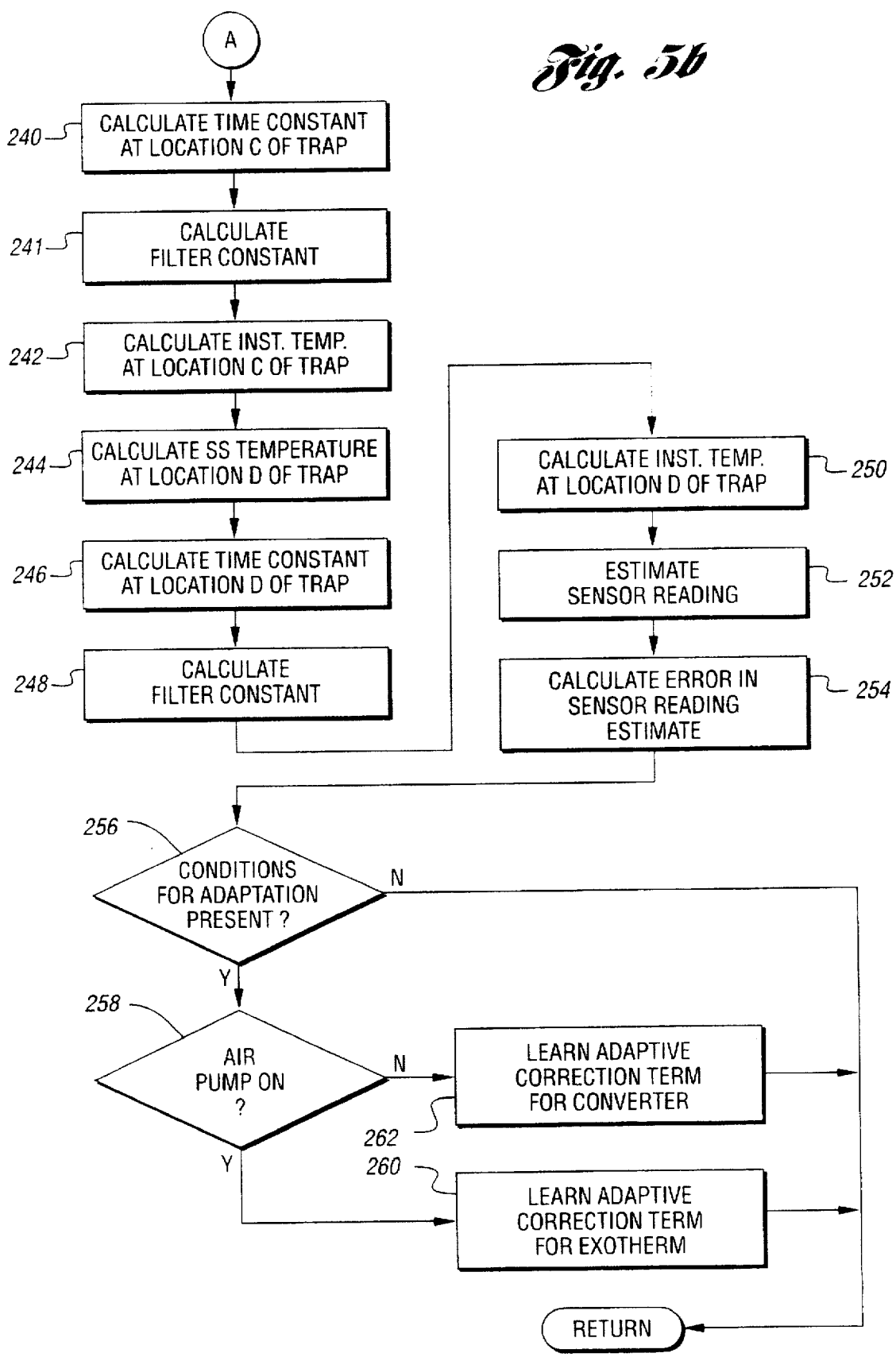

Referring now to FIG. 5, a flowchart depicting the steps in a routine performed by the EEC 20 for inferring $NO_x$ trap temperature is shown. The temperature determination routine is entered at 200 and at 202 an initialization flag EXT_INIT is checked to determine if certain temperature variables have been initialized. If not, the temperature variables are initialized at 204, after which the flag EXT_INIT is set to 1. A preferred embodiment advantageously initializes certain temperature variables in a manner to account for instances where an engine may be turned off for short periods of time in which the $NO_x$ trap 30 may not have cooled to ambient temperature. $NO_x$ trap over temperature conditions are accordingly avoided by estimating $NO_x$ trap temperature upon engine ignition as a function of estimated $NO_x$ trap temperature upon engine shutoff, ambient temperature, a calibratable time constant indicative of $NO_x$ trap cooling and the time elapsed from engine shutoff to subsequent engine operation. The initialization of the temperature at locations "B", "C" and "D" is accomplished in accordance with the following Equations 1, 2 and 3.

$$\text{ext\_ntB\_init}=((\text{ext\_ntB\_prev}-\text{infamb})*\text{fnexp}(-\text{soaktime/tc\_ntB}))+\text{infamb} \quad (1)$$

$$\text{ext\_ntC\_init}=((\text{ext\_ntC\_prev}-\text{infamb})*\text{fnexp}(-\text{soaktime/tc\_ntC}))+\text{infamb} \quad (2)$$

$$\text{ext\_tso}=\text{ext\_ntD\_init}=\text{ext\_ntC\_init} \quad (3)$$

where:

ext_ntB_prev=estimated $NO_x$ trap temperature when engine was turned off, fnexp is a look-up table value that approximates an exponential function, soaktime=time since engine was shut down in seconds, tc_nt=an empirically derived time constant associated with the cooling off of the exhaust gas at an identified location such as "B", in seconds, infamb=inferred ambient temperature, and ext_tso=estimated temperature at temperature sensor location "D".

Ambient temperature may be inferred as indicated above or measured with a sensor. When ambient temperature is inferred (infamb) the value is stored keep-alive memory 78 and is initialized at block 204. If the absolute difference between air charge temperature (ACT) and engine coolant temperature (ECT) is within a calibratable tolerance, usually about 6 degrees, it may be assumed that the engine is at equilibrium or ambient temperature and therefore that ambient temperature is equal to ACT. Otherwise, ambient temperature is assumed to be smaller of the last known ambient temperature in K_AM 78 or ACT.

If the engine is running and if engine coolant temperature and vehicle speed are above minimum values, then a steady-state forcing function is calculated as ACT−Δ, where Δ is about 10 degrees F. if the air conditioning clutch is not engaged and is about 20 degrees F. if the air conditioning clutch is engaged. Normally, the forcing function is filtered by a rolling average but if ACT is ever less than inferred ambient then infamb is set to ACT immediately.

At block 210, the instantaneous midbed (usually 1" into the first brick) temperature of the catalytic converter 26 is calculated in accordance with the disclosure in U.S. Pat. No. 5,414,994, assigned to the assignee of the present invention and incorporated herein by reference. At block 211, the midbed temperature calculated in block 210 is corrected by adding an adaptive temperature correction value as a function of air mass. Preferably, three (3) correction values are stored in KAM 78 for three (3) different ranges of engine air mass. The appropriate correction value is accessed based on measured air mass. The correction values are adaptively learned during vehicle operation under relatively steady-state conditions, as will be described more fully hereinafter, and are stored in KAM 78 for use at the program step performed in block 211.

At block 212, the temperature loss in the exhaust passage between the midbed of the catalytic converter 26 and the entrance "B" to the $NO_x$ trap 30 is calculated in accordance with Equation 4.

$$\text{ext\_ls\_ntB}=\text{FNLS\_NTB}(am)*[(\text{ext\_cmd}+\text{ext\_ntB\_prev})/2-\text{infamb}] \quad (4)$$

where:

FNLS_NTB(am) is a unitless value, contained in a table indexed by mass air flow (am), which is indicative of a temperature drop between the catalytic converter and location "B" as a function of (am), ext_cmd=instantaneous converter catalyst midbed temperature calculated in block 210, and ext_ntB_prev=value of ext_ntB for the previous loop.

At block 214 the steady-state $NO_x$ trap inlet temperature at location "B" is calculated, in accordance with Equation 5.

$$\text{ext\_ss\_ntB}=\text{ext\_cmd}-\text{ext\_ls\_ntB} \quad (5)$$

This is the exhaust gas temperature before the pierce point 62 of the air passage 58, which is just upstream of the entrance of the $NO_x$ trap 30. This temperature is determined by subtracting the temperature loss, calculated at block 212, from the corrected catalyst midbed temperature, calculated at block 211.

At block 216, the time constant of the temperature rise at the trap inlet is a function of air mass flow and is evaluated in accordance with Equation 6.

$$\text{tc\_ntB\_run}=\text{FNTC\_NTB}(am) \quad (6)$$

where:

FNTC_NTB(am)=ROM calibration data table value of time constant, in seconds, indexed by air mass.

At block 218, a filter constant that perform an exponential smoothing function, is calculated from the time constant determined at block 216 in accordance with Equation 7.

$$\text{fk\_ntB}=1/(1+\text{tc\_ntB\_run/bg\_tmr}) \quad (7)$$

where:

bg_tmr is the time, in seconds, for execution of the background loop.

At block 220, the instantaneous $NO_x$ trap inlet temperature at location "B" is calculated in accordance with Equation 8, based on the previous instantaneous value at "B", the new estimated steady-state value, and a predetermined temperature rate of change at "B" as a function of engine air mass flow.

$$\text{ext\_ntB}=\text{fk\_ntB}*\text{ext\_ss\_ntB}+(1-\text{fk\_ntB})*\text{ext\_ntB\_prev} \quad (8)$$

where:

ext_ntB_prev=previous value of inlet temperature.

The temperature at the front face "C" of the material 32, is the total heat flow divided by the heat capacity of the exhaust flow, overlooking for the moment the effect on this temperature of the exothermic reaction of the exhaust gas with the trap material. At block 222, this total heat flow is calculated in accordance with Equation 9.

$$\begin{aligned}\text{tot\_heat\_flw} = \ &\text{EXT\_CP\_FUEL2} * \text{fuel\_flow} * \text{ext\_ntB} + \\ &\text{EXT\_CP\_AIR2} * \text{am} * \text{ext\_ntB} + \\ &\text{EXT\_CP\_AIR2} * \text{airpump\_am} * \text{infamb}\end{aligned} \quad (9)$$

where:

EXT_CP_FUEL2=heat capacity of fuel and is a calibration constant,

EXT_CP AIR2=heat capacity of air and is a calibration constant, airpump_am=air pump air mass flow in kg/min am=engine air mass flow (kg/min)

fuel flow=engine fuel flow (kg/min).

The heat capacity of this total heat flow is calculated in accordance with Equation 10, at block 224.

$$\begin{aligned}\text{exh\_ht\_cap} = \ &\text{EXP\_CP\_AIR2} * (\text{am} + \text{airpump\_am}) + \\ &\text{EXT\_CP\_FUEL2} * \text{fuel\_flow}\end{aligned} \quad (10)$$

As previously stated, the temperature at the front face "C" of the trap material 32, before exotherm is the total heat flow calculated at block 222 divided by the heat capacity of the heat flow calculated at block 224, and is calculated at block 226 in accordance with Equation 11.

$$\text{ext\_ntC\_before\_exo} = \text{tot\_heat\_flw}/\text{exh\_ht\_cap} \quad (11)$$

The exotherm energy calculation depends on whether the air/fuel ratio at the entrance to the NO$_x$ trap 30 is rich or lean as calculated at block 228. The exhaust air/fuel ratio at the entrance to the NO$_x$ trap 30 is calculated in accordance with Equation 12.

$$\text{lambse\_ntr} = \text{lambse\_exh} * ((\text{airpump\_am} + \text{am})/\text{am}) \quad (12)$$

where:

lambse_exh is the exhaust A/F equivalence ratio measured before the air from the air pump is introduced in the exhaust.

If the A/F is rich, the exotherm energy is limited by and proportional to the amount of air pump air mass. Once all of the excess air is burned, additional rich products (hydrocarbons) cannot burn or produce further heat. If rich, as determined at block 230, the exotherm energy is calculated in accordance with Equation 13, as indicated at block 232.

$$\text{ntr\_exo\_energy} = \text{airpump\_am} * \text{FN\_NTR\_EXO\_R (lambda\_ntr)} \quad (13)$$

where:

FN_NTR_EXO_R(lambda_ntr) is a value obtained from a look-up table that contains empirical data describing the exotherm energy. The units are joules per pound of air pump air mass and is mapped against the exhaust A/F.

If the air/fuel ratio is lean, then exotherm energy is calculated in block 234 in accordance with Equation 14. When lean, the exotherm energy is limited by and proportional to the engine air mass which at a given equivalence ratio is proportional to fuel mass or heat energy.

$$\text{ntr\_exo\_energy} = (\text{am}) * \text{FN\_NTR\_EXO\_L(lambse\_ntr)} \quad (14)$$

where:

FN_NTR_EXO_L(lambse_ntr) is a value obtained from a look-up table that contains empirical data describing the exotherm energy. The units are joules per pound of air pump air mass and is mapped against the exhaust A/F.

In either event, if the air pump 54 is ON, as determined in block 235, an adaptive exotherm correction term, apx_cor_tmp, discussed hereinafter, is read from KAM 78 at block 236 and added to the calculation of exotherm temperature at block 238 in accordance with Equation 15. Preferably, three (3) correction values are stored in KAM 78 for three (3) different ranges of engine air mass and the appropriate correction value is accessed based on measured air mass. The exotherm temperature is the exotherm energy calculated in Equations 13 or 14 divided by the heat capacity calculated in Equation 10.

$$\text{ext\_ntr\_exo} = \text{ntr\_exo\_energy}/\text{exh\_ht\_cap} + \text{apx\_cor\_tmp} \quad (15)$$

If the air pump 54 is OFF, then the adaptive correction term, apx_cor_tmp, is set to 0 at block 237.

The forcing function or steady-state equivalent of the temperature near the front face of the NO$_x$ trapping material 32, indicated at "C", is calculated in block 239 in accordance with Equation 16, and is the combined temperature due to the gas temperature and the air pump induced exotherm. The air pump pierce point 62 is close enough to the NO$_x$trap 30 to ignore a temperature drop from "B" to "C"

$$\text{ext\_ss\_ntC} = \text{ext\_ntC\_before\_exo} + \text{ext\_ntr\_exo} \quad (16)$$

The time constant of the temperature rise near the front face "C" of the trap 30 is a calibratable function of the total airflow and is evaluated at block 240 in accordance with Equation 17.

$$\text{tc\_ntC run} = \text{FNTC\_NTC}(\text{am} + \text{airpump\_am}) \quad (17)$$

where:

FNTC_NTC=ROM calibration data table value of time constant, in seconds, indexed by total air mass.

At block 241, a filter constant for performing a smoothing function is calculated in accordance with Equation 18 based on the time constant, evaluated in accordance with Equation 17.

$$\text{fk\_ntC} = 1/(1 + \text{tc\_ntC\_run}/\text{bg\_tmr}) \quad (18)$$

Finally, at block 242, the instantaneous temperature near the front face "C" of the trap 30 is calculated in accordance with Equation 19 from the previous value, new steady-state value, and the filter constant.

$$\text{ext\_ntC} = \text{fk\_ntC} * \text{ext\_ss\_ntC} + (1 - \text{fk\_ntC}) * \text{ext\_ntC\_prev} \quad (19)$$

where:

ext_ntC_prev=the value of ext_ntC calculated on the previous loop.

At blocks 244 through 248, a temperature which is more representative of an average temperature of the trap 30 is calculated. At block 244, the steady-state average temperature of the trap 30 is calculated in accordance with Equation 20, which is based on the assumption that there is no temperature drop from the location "C" to the location "D" and therefore at steady-state the two temperatures are equal.

$$ext\_ss\_ntD=ext\_ntC \qquad (20)$$

There is a time constant as a function of air mass which causes the temperature at location "D" to lag the temperature at location "C". This time constant is due to the thermal capacitance of the trap substrate and trap material. At block 246, the time constant at location "D" in the trap is evaluated in accordance with Equation 21. This time constant is a function of the total air flow.

$$tc\_ntD\_run=FNTC\_NTD(am+airpump\_am) \qquad (21)$$

A filter constant is calculated at block 248 from the time constant in accordance with Equation 22.

$$fk\_ntD=1/(1+tc\_ntD\_run/bg\_tmr) \qquad (22)$$

Finally, the instantaneous average temperature of the trap 30 is calculated at block 250 in accordance with Equation 23 from the previous value, new steady-state value, and the filter constant.

$$ext\_ntD=fk\_ntD*ext\_ss\_ntD+(1-fk\_ntD)*ext\_ntD\_prev \qquad (23)$$

At block 252 an estimate of what the temperature sensor 32 should be reading is calculated. The estimated average substrate temperature of the $NO_x$ trap determined at block 250, is an estimate of the instantaneous temperature at the location of the temperature sensor 32, assuming no steady-state temperature drop between location "D" and the sensor location. This equality is indicated in Equation 24.

$$ext\_ss\_tso=ext\_ntD; \qquad (24)$$

The actual reading of the sensor 32 is delayed from this value due to its thermal mass. In order to create an estimate of what the sensor 32 will read during transient conditions, the estimated temperature is adjusted by a time constant related to the sensor 32 as indicated in Equation 25.

$$ext\_tso=fk\_tso*ext\_ss\_tso+(1-fk\_tso)*ext\_tso\_prev \qquad (25)$$

where:
ext_tso_prev=previous estimated sensor reading,
tc_tso_run=FNTC_TSO(am+airpump_am)=ROM calibration data table value of time constant, in seconds, indexed by total air mass, and
fk_tso=1/(1-tc_tso_run/bg_tmr)=filter constant of the sensor.

At block 254, the error between the estimated sensor output (exh_tso) and the actual sensor output (tso act) is calculated in accordance with Equation 26.

$$ext\_err\_tso=ext\_tso-tso\_act; \qquad (26)$$

At block 256, a determination is made whether relatively steady-state conditions are present, and adaptive learning can proceed. Such conditions are present if (a) the absolute value of the difference between the steady-state estimate of the output of sensor 32 and the instantaneous estimate is less than a calibratable tolerance value TSO_ADP_TOL, as indicated in Equation 27, and (b) the instantaneous estimate of the temperature measured by the sensor 33 is greater than a predetermined minimum temperature value TSO_ADP_MIN as indicated in Equation 28.

$$abs(ext\_ss\_tso\_ext\_tso)<TSO\_ADP\_TOL \qquad (27)$$

$$ext\_tso>TSO\_ADP\_MIN \qquad (28)$$

If the conditions of Equations 27 and 28 are met and the air pump 54 is ON, as determined at decision block 258, then a term for correcting the temperature due to air pump exotherm is learned at block 260. The correction term is a rolling average of the error between the estimated and actual sensor readings and is stored in KAM 78. The procedure for learning the adaptive corrections at a given air mass is as follows. Assume that TSO_ADP_AM1, TSO_ADP_AM2, and TSO_ADP_AM3 are three (3) calibratable air mass levels which define three regions where three adaptive coefficients will be learned. If the present measured air mass value<am) is less than TSO_ADP_AM1, then the adaptive exotherm correction term that is learned is expressed by Equation 29.

$$apx\_cor1=fk\_apx\_cor1*ext\_err\_tso+(1-fk\_apx\_cor1)*apx\_cor1\_prev \qquad (29)$$

where:
fk_apx_cor1=1/(1+tc_APX_COR1/bg_tmr)
tc_APX_COR1=the time constant controlling the desired rate of adaptive learning,
fk_apx_cor1=the filter constant equivalent of the time constant,
apx_cor1_prev=previous adaptive correction term.

Similarly, if the present measured air mass value (am) is between TSO_ADP_AM1 and TSO_ADP_AM2, then the adaptive exotherm correction term that is learned is expressed by Equation 30.

$$apx\_cor2=fk\_apx\_cor2*ext\_err\_tso+(1-fk\_apx\_cor2)*apx\_cor2\_prev \qquad (30)$$

Finally, if the present measured air mass value (am) is between TSO_ADP_AM2 and TSO_ADP_AM3, then the adaptive exotherm correction term that is learned is expressed by Equation 31.

$$apx\_cor3=fk\_apx\_cor3*ext\_err\_tso+(1-fk\_apx\_cor3)*apx\_cor3\_prev \qquad (31)$$

The values of apx_cor1, apx_cor2, apx_cor3 are stored in KAM 78.

As indicated previously, the calculation of exotherm temperature at block 238 includes the adaptive correction term learned at block 260 as indicated in Equation 15.

If the conditions of Equations 27 and 28 are met and the air pump 54 is OFF as determined at decision block 258, then an adaptive converter midbed temperature correction term is learned at block 262. The correction term is a rolling average of the error between the estimated and actual sensor readings and is stored in KAM 78. The procedure for learning the adaptive corrections at a given air mass is as follows. If the present measured air mass value (am) is less than TSO_ADP_AM1, then the adaptive converter midbed correction term that is learned is expressed by Equation 32.

$$cmd\_cor1=fk\_cmd\_cor1*ext\_err\_tso+(1-fk\_cmd\_cor1)*cmd\_cor1\_prev \quad (32)$$

where:

$fk\_cmd\_cor1=1/(1+tc\_CMD\_COR1/bg\_tmr)$

Similarly, if the present measured air mass value (am) is between TSO_ADP_AM1 and TSO_ADP_AM2, then the adaptive converter midbed correction term that is learned is expressed by Equation 33.

$$cmd\_cor2=fk\_cmd\_cor2*ext\_err\_tso+(1-fk\_cmd\_cor2)*cmd\_cor2\_prev \quad (33)$$

where:

$fk\_cmd\_cor2=1/(1+tc\_CMD\_COR2/bg\_tmr)$

Finally, if the present measured air mass value(am) is between TSO_ADP_AM2 and TSO_ADP_AM3, then the adaptive converter midbed correction term that is learned is expressed by Equation 34.

$$cmd\_cor3=fk\_cmd\_cor3*ext\_err\_tso+(1-fk\_cmd\_cor3)*cmd\_cor3\_prev \quad (34)$$

where:

$fk\_cmd\_cor3=1/(1+tc\_CMD\_COR3/bg\_tmr)$

The values of cmd_cor1, cmd_cor2, cmd_cor3 are stored in KAM 78.

The calculation of the midbed temperature of the catalytic converter catalyst made at block 210 is corrected, on the next background loop, in block 211 by one of the three (3) correction terms, depending on measured air mass, in accordance with Equation 35.

$$ext\_cmd=current\_calculation+cmd\_cor \quad (35)$$

where:

cmd_cor=cmd_cor1, cmd_cor2 or cmd_cor3 depending on air mass (am), current_calculation=calculation made at block 210.

Figure 6:
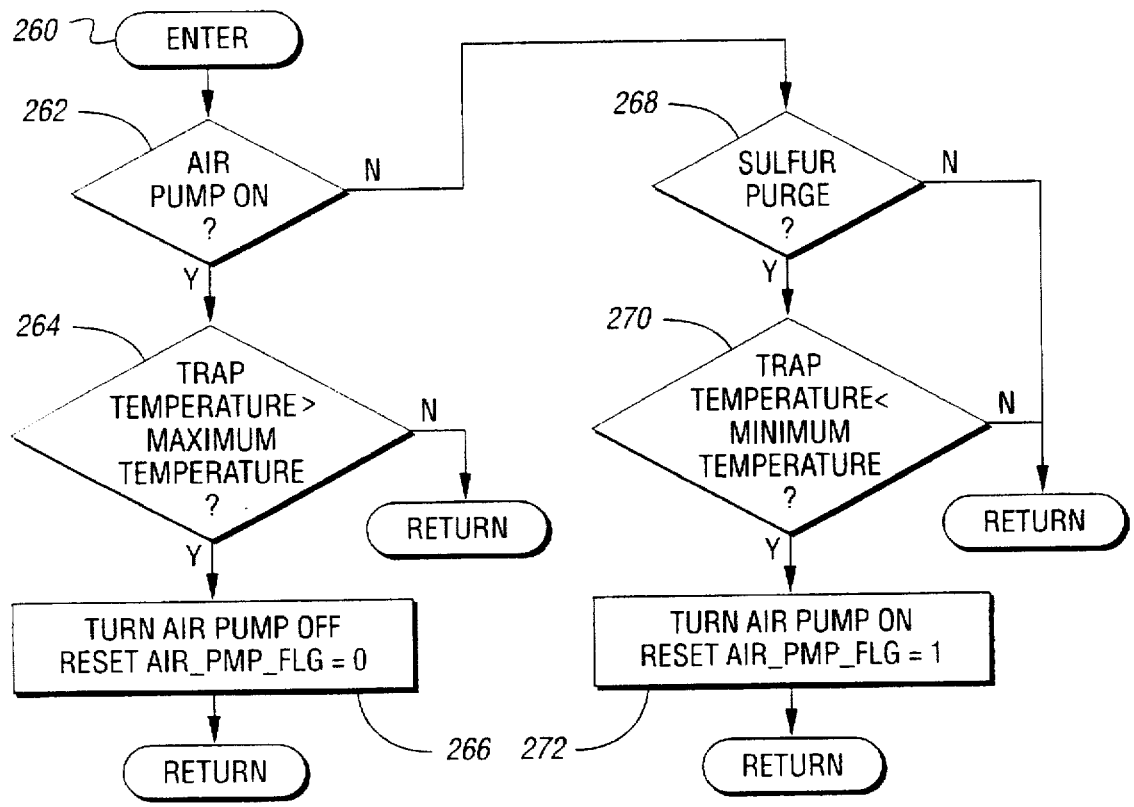
FIG. 6 is a flowchart of a air pump control valve control scheme based on $NO_x$ trap temperature.

Knowing the temperature of the $NO_x$ trap permits various control schemes. One scheme is to disable the lean open loop operation and enter a closed loop stoichiometric operation if the estimated temperature is greater than a predetermined maximum temperature. If the temperature remains too high during stoichiometric operation, a rich open loop mode of operation may be invoked. Another use is the control of the air pump control valve 56 in accordance with the flowchart shown in FIG. 6. The routine shown in FIG. 6 is entered at 260 and at decision block 262 the status of the air pump flag AIR_PMP_FLG is checked. If the flag is set, indicating that the air pump is ON, then the trap temperature at location "C" of the $NO_x$ trap is compared with a maximum temperature above which the trap is subject to irreversible damage. If the maximum temperature is exceeded, as determined by block 264, then the air pump is turned off at block 266 and the flag AIR_PMP_FLG is reset and the routine returns to the main program. On the other hand, if the pump is not ON and a sulphur purge of the $NO_x$ trap is required as determined by the block 268, then the trap temperature at location "D" is checked at block 270 to determine if the temperature is less than the minimum temperature required for $SO_x$ purging. If so, the air pump is turned ON at block 272 in order to raise the $NO_x$ trap temperature and the flag AIR_PMP_FLG is set and the routine returns to the main program.

Figure 7:
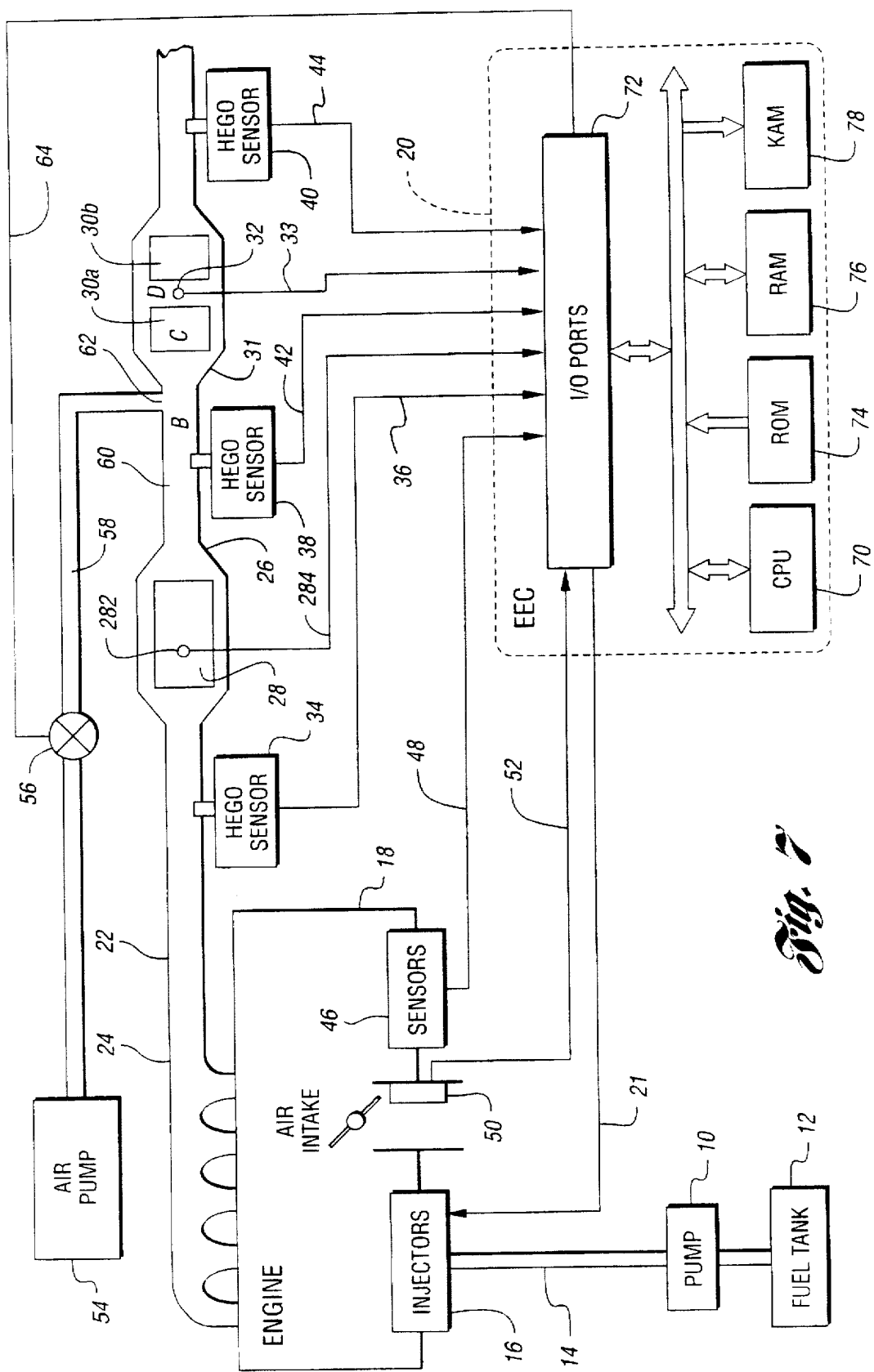
FIG. 7 is a block diagram showing another embodiment of the invention wherein the catalytic converter includes a temperature sensor.
Figure 8:
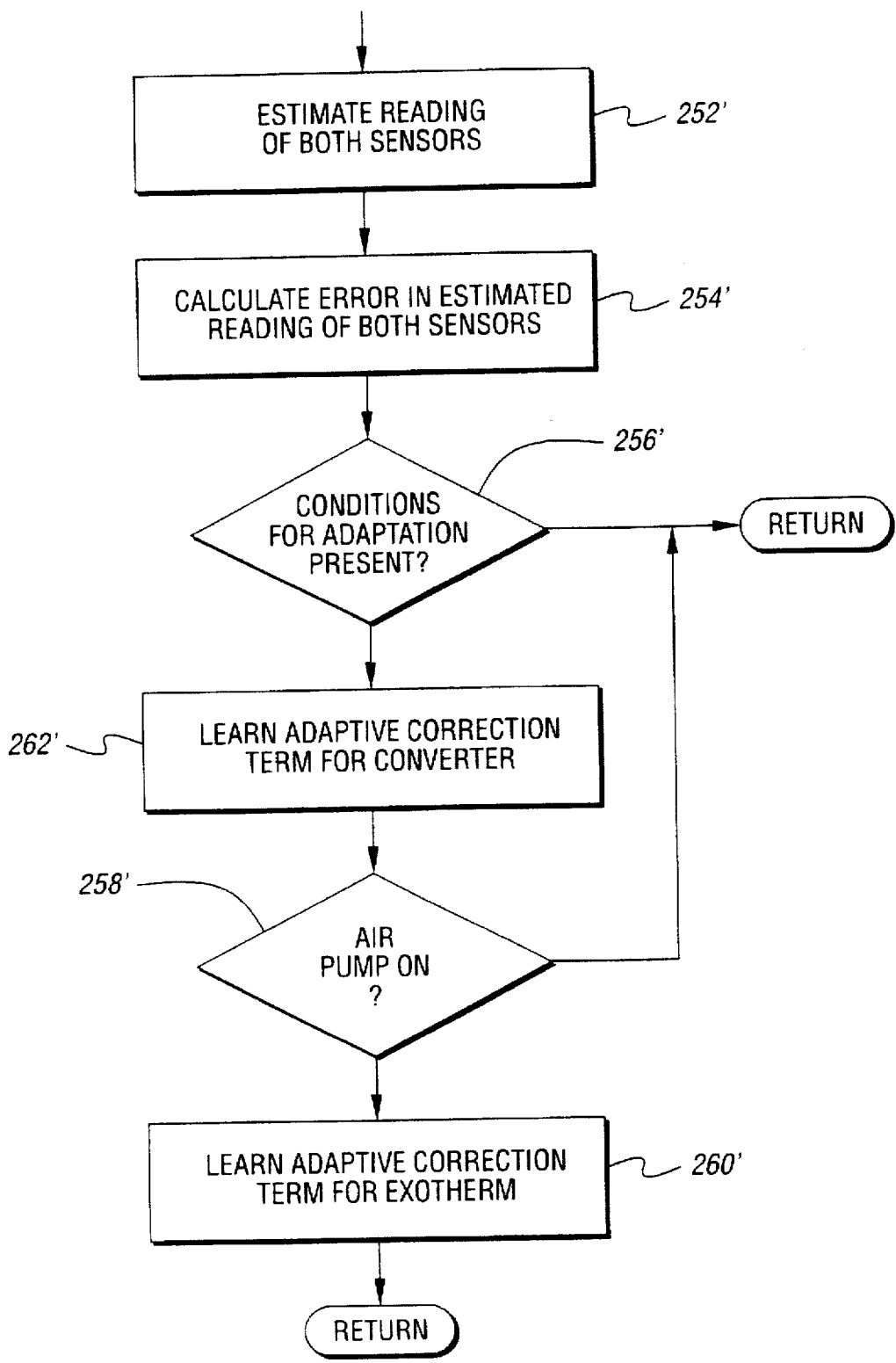
FIG. 8 is a flowchart modification of FIG. 5b, applicable to the embodiment of FIG. 7.

Referring now to FIG. 7, another embodiment of the invention is disclosed wherein like elements of FIG. 1 are identified by like numerals. FIG. 7 differs from FIG. 1 in that the catalytic converter 26 is also provided with a temperature sensor 282 that communicates with the EEC 20 over conductor 284. With the sensor 282 provided, the sensor 32 in the trap 31 is no longer needed to correct the catalyst midbed temperature. Instead, the routine of FIGS. 5a–5b would be modified beginning at block 252 as shown in FIG. 8. The temperature sensed by both the sensor 32 and 282 will be estimated at block 252'. It is assumed that no steady-state temperature drop exist between the midbed location and the sensor 282 location. This equality is indicated in Equation 36.

$$ext\_ss\_tso=ext\_cmd; \quad (36)$$

The actual reading of the sensor 282 is delayed from this value due to its thermal mass. In order to create an estimate of what the sensor 282 will read during transient conditions, the estimated temperature is adjusted by a time constant related to the sensor 282 as indicated in Equation 25.

If relatively steady-state conditions are present, as determined in block 256' based on Equations 27 and 28 then adaptive learning proceeds for the midbed correction term in block 262'. The adaptive learning is carried out as previously described using Equations 32–34 and the error calculated in block 254' with respect to the sensor 282.

If the air pump is ON as determined by block 258', then the correction term for exotherm is learned at block 260' as previously described in connection with block 260. Otherwise, the routine returns to the main program.

The calculation of the midbed temperature of the catalytic converter catalyst made at block 210 is corrected, on the next background loop, by one of the three (3 correction terms learned in block 262'.

While the best mode for carrying out the present invention has been described in detail, those familiar with the art to which this invention relates will recognize various alternative designs and embodiments for practicing the invention as defined by the following claims.

What is claimed is:

1. A method of estimating the temperature of a $NO_x$ trap located in an exhaust passage of an engine, said trap including a sensor for measuring the temperature of the trap, said method comprising a sequence of the steps of:

estimating the instantaneous temperature of said trap;

estimating temperature output of said sensor based on a previous estimate of said sensor output, said instantaneous trap temperature, and a predetermined temperature rate of change of said sensor as a function of engine air mass flow;

calculating the temperature error between the said estimated sensor output and the actual output of the sensor;

learning a trap temperature correction term based on said temperature error; and correcting said estimated trap temperature using said correction term.

2. The method of claim 1 wherein said trap is located in said exhaust passage downstream from a catalytic converter; said method comprising the additional steps of:

estimating the instantaneous midbed temperature of said converter;

calculating the exothermic temperature at the trap entrance;

said step of estimating the instantaneous temperature of said trap is based on said midbed temperature and said exothermic temperature.

3. The method of claim 2 wherein said exhaust passage includes a pierce point located between said converter and said trap for adding controlled amounts of air to the exhaust prior to entry into said trap, and wherein said learning step comprises:

learning an adaptive exotherm temperature correction term based on said error and correcting said exothermic temperature calculation using said adaptive exotherm correction term.

4. The method of claim 2 comprising the further steps of:

learning an adaptive catalyst midbed temperature correction term based on said error;

correcting said estimated midbed temperature using said midbed temperature correction term.

5. A method of controlling the temperature of a $NO_x$ trap including the trap temperature estimating steps of claim 3, and further comprising the steps of:

reducing the amount of air if the $NO_x$ trap temperature exceeds a predetermined maximum temperature;

increasing the amount and commanding a closed loop stoichiometric mode of engine operation, if the $NO_x$ trap temperature drops below a predetermined minimum temperature.

6. A method of estimating the temperature of a $NO_x$ trap located in an exhaust passage of an engine downstream from a catalytic converter, said trap including a sensor for measuring the temperature of the trap, said exhaust passage including a pierce point located between said converter and said trap for adding controlled amounts of air from an air pump to the exhaust prior to entry into said trap resulting in a total exhaust flow, said method comprising a sequence of the steps of:

calculating the instantaneous temperature at a first location upstream of said pierce point based on a previous instantaneous temperature value at said first location, an estimated steady-state value, and a predetermined temperature rate of change at said first location as a function of engine air mass flow;

calculating the total exhaust heat flow at a second location at the front face of the $NO_x$ trap before accounting for any exothermic reaction;

calculating the heat capacity of said total exhaust flow;

calculating the instantaneous temperature at said second location by dividing said heat flow by said heat capacity;

calculating the total exhaust air/fuel ratio at said second location;

if said total exhaust air/fuel ratio is rich, calculating the exothermic energy as a function of the amount of air pump air mass and the total exhaust air/fuel ratio;

if said total exhaust air/fuel ratio is lean, calculating the exothermic energy as a function of the amount of engine air mass and the total exhaust air/fuel ratio;

calculating the temperature generated by the exothermic energy at said second location;

calculating the steady-state temperature at said second location by adding the calculated temperature before any exothermic reaction to the calculated temperature generated by the exothermic energy;

calculating the instantaneous temperature at said second location based on a previous instantaneous temperature value at said second location, said estimated steady-state value at said second location, and a predetermined temperature rate of change at said second location as a function of the sum of engine air mass flow and air pump air mass flow;

inferring the temperature within the $NO_x$ trap at the location of said sensor based on a previous estimated instantaneous temperature value at the sensor location, said estimated steady-state value at said sensor location, and a predetermined temperature rate of change of said sensor output as a function of total exhaust flow;

calculating the error between the estimated temperature at the sensor location and the actual temperature measured by the sensor;

learning an adaptive exotherm temperature correction term based on said error; and correcting the exothermic temperature calculation using said adaptive exotherm temperature correction term.

7. The method of claim 6 further comprising the steps of:

estimating the instantaneous exhaust gas temperature at a midbed location in the catalyst of said catalytic converter;

estimating the drop in exhaust gas temperature from said midbed location to said first location upstream of said pierce point;

learning a catalyst midbed temperature correction term based on said error; and correcting said estimated midbed temperature using the amount of said midbed correction term.

8. The method of claim 6 wherein said steady-state value at said first location is based on the estimated instantaneous midbed temperature of said converter minus the loss between said converter and said first location.

9. A method of controlling the temperature of a $NO_x$ trap including the trap temperature estimating steps of claim 6, and further comprising the steps of:

reducing the amount of air if the $NO_x$ trap temperature exceeds a predetermined maximum temperature;

increasing the amount of air and commanding a closed loop stoichiometric mode of engine operation, if the $NO_x$ trap temperature drops below a predetermined minimum temperature.

10. A method of controlling the temperature of a $NO_x$ trap including the trap temperature estimating steps of claim 6, and further comprising the steps of:

turning the air pump ON if a $SO_x$ purge criteria is met to raise the temperature of the trap above a predetermined minimum temperature;

turning the air pump OFF if the $NO_x$ trap temperature exceeds a predetermined maximum temperature.

11. A method of correcting the estimated temperature of a catalytic converter located in an exhaust passage of an engine with a $NO_x$ trap located downstream from said catalytic converter, said trap including a sensor for measuring the temperature of the trap, said method comprising a sequence of the steps of:

estimating the instantaneous midbed temperature of said converter;

calculating the exothermic temperature at the trap entrance;

estimating the temperature at the sensor location in the trap based on said midbed temperature and said exothermic temperature;

calculating the temperature error between the estimated output of the sensor and the actual output of the sensor;

learning a catalyst midbed temperature correction term based on said temperature error; and correcting said estimated midbed temperature using said midbed correction term.

12. A method of correcting the estimated temperature of a catalytic converter located in an exhaust passage of an engine, said converter including a sensor for measuring the temperature of the converter, said method comprising a sequence of the steps of:

estimating the instantaneous midbed temperature of said converter;

estimating temperature output of said sensor based on a previous estimate of said sensor output, said instantaneous midbed temperature of said converter, and a predetermined temperature rate of change of said sensor as a function of engine air mass flow;

calculating the temperature error between the said estimated sensor output and the actual output of the sensor;

learning a catalyst midbed temperature correction term based on said temperature error; and correcting said estimated midbed temperature using said midbed correction term.

* * * * *